United States Patent [19]

Jung

[11] Patent Number: 5,534,930
[45] Date of Patent: Jul. 9, 1996

[54] METHOD FOR CONSTRUCTING A QUANTIZATION PATTERN CODEBOOK

[75] Inventor: Hae-Mook Jung, Seoul, Rep. of Korea

[73] Assignee: Daewoo Electronics Co., Ltd., Seoul, Rep. of Korea

[21] Appl. No.: 304,061

[22] Filed: Sep. 12, 1994

[51] Int. Cl.$^6$ ..................................................... H04N 7/50
[52] U.S. Cl. .......................... 348/405; 375/245; 348/422
[58] Field of Search ...................... 382/50, 56; 348/403, 348/405, 414, 417, 418, 420, 422, 419; 375/245; H04N 7/50

[56] References Cited

U.S. PATENT DOCUMENTS 5,134,477  7/1992  Knauer .................................... 348/416
5,283,646  2/1994  Bruder .................................... 375/245
5,426,463  6/1995  Reininger ................................ 348/405

Primary Examiner—Howard W. Britton
Attorney, Agent, or Firm—Anderson Kill Olick & Oshinsky

[57] ABSTRACT

A quantization pattern codebook is prepared by way of: merging each pair of pattern clusters into a merged pattern cluster until all combinable pairs of the pattern clusters are merged to derive a set of merged pattern clusters; calculating the rate of bit increment by subtracting the total number of quantization bits in the pair of the quantization patterns used in the merging process from the total number of quantization bits in the merged pattern cluster derived from the pair of the pattern clusters; and determining the merged pattern cluster having a minimum rate of bit increment as one of the cluster patterns to be stored in the pattern code book.

1 Claim, 9 Drawing Sheets

METHOD FOR CONSTRUCTING A QUANTIZATION PATTERN CODEBOOK

FIELD OF THE INVENTION

The present invention relates to a method for optimally constructing a quantization pattern codebook for use in a video encoding apparatus.

DESCRIPTION OF THE PRIOR ART

In various electronic applications such as high definition television and video telephone systems, an image signal may be transmitted in a digitized form. When the image signal comprising a sequence of image "frames" is expressed in a digital form, there occurs a substantial amount of digital data: for each line of an image frame is defined by a sequence of digital data elements referred to as "pixel". Since, however, the available frequency bandwidth of a conventional transmission channel is limited, in order to transmit the substantial amounts of digital data through the fixed channel, an image signal encoding apparatus is normally used to compress the digital data.

Conventional image signal encoding apparatus typically includes a transform coder, e.g., DCT (Discrete Cosine Transform) coder, which sequentially converts a plurality of blocks of, e.g., 8×8, pixels contained in the image signal into a plurality of sets of transform coefficients. This DCT coder is described in, for example, Chen and Pratt, "Scene Adaptive Coder", *IEEE Transactions on Communications*, COM-32, No.3(March 1984). Such sets of 8×8 transform coefficients are then grouped into, e.g., 2×2, arrays, each of which is combined to form a 64 cell superblock vector, wherein each cell contains 4 transform coefficients. The 64 cell superblock vectors are sequentially processed with a quantization circuit in which they are converted into quantized data.

One example of such quantization circuits is disclosed in U.S. Pat. No. 5,134,477 issued to Scott C. Knauer, et al., which includes a quantization pattern codebook storing a limited number of quantizer patterns, i.e., 2048, in order to reduce the hardware requirement and to simplify the encoding process. One quantizer pattern can be selected in order to quantize a 64 cell superblock vector. That is, the selected quantizer pattern has a number of quantizers for allowing a different quantizer to be used for quantizing different cells so that the resulting quantization data may have fewer bits and errors when the superblock vector is quantized.

Therefore, the performance of a quantization circuit is heavily dictated by the quantization pattern codebook. However, since a limited number of quantizer patterns, i.e., 2048, is arbitrarily selected from an enormous pool of their combinable quantizer patterns, i.e., $4^{64}$, using 4 different quantizers, it is difficult expect for the prior art quantization circuit to yield a minimum amount of quantized data with a minimum overall quantization error in regularity.

SUMMARY OF THE INVENTION

It is, therefore, a primary object of the invention to provide a method for constructing a quantization pattern codebook which is capable of efficiently providing a minimum amount of quantized data.

In accordance with the present invention, there is provided a method for constructing a quantization pattern codebook for use in an image coding apparatus, wherein the quantization codebook has M number of quantization patterns, each of the M quantization patterns having N number of different quantizers, each of the N quantizers including one or more quantization levels, with M and N being positive integers, which comprises the steps of: (a) selecting the N number of different quantizers wherein a higher quantizer includes all of the quantization levels in a lower quantizer; (b) forming T number of quantization patterns corresponding to T number of test superblock vectors using the selected N number of different quantizers, each of the quantization patterns having a minimum quantization error for each of the test superblock vectors, wherein T is a positive integer and greater than M; (c) sorting the T number of quantization patterns into a plurality of pattern clusters, wherein identical quantization patterns are grouped into a pattern cluster; (d) merging each pair of the pattern clusters into a merged pattern cluster; (e) repeating said step (d) until all of the combinable pairs of the pattern clusters are merged into their respective merged pattern clusters; (f) calculating a rate of bit increment by subtracting the total number of quantization bits in said each pair of pattern clusters used in said step (d) from the total number of quantization bits in the merged pattern cluster derived from said each pair of pattern clusters; (g) repeating said step (f) until all of the rates of bit increment for all of the merged pattern clusters are obtained; (h) determining a merged pattern cluster having a minimum rate of bit increment; (i) setting the determined merged pattern cluster as pattern cluster; (j) repeating said steps (d) to (j) by using all of pattern clusters excepting the pair of pattern clusters used in forming the merged pattern cluster determined in said step (h) until M number of pattern clusters are obtained as said M number of quantization patterns to be used in the quantization pattern codebook.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
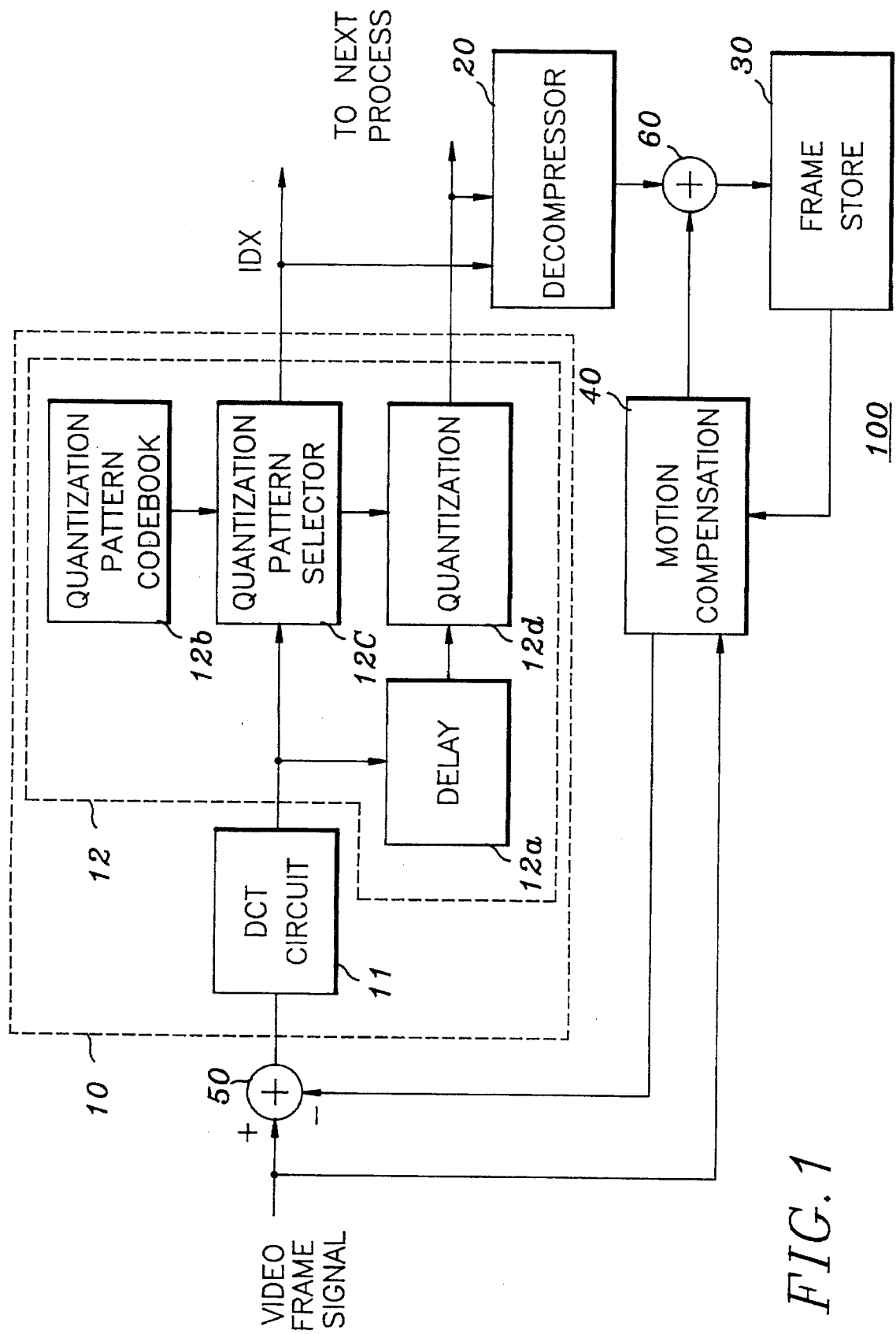
FIG. 1 is a schematic block diagram of the image coding apparatus employing the quantization pattern codebook in accordance with the present invention.

Referring to FIG. 1, there is shown an image coding apparatus employing the quantization pattern codebook constructed in accordance with the present invention. The image coding apparatus eliminates redundancies in a video frame signal in order to compress the video frame signal to a more manageable size for transmission; and includes a differential pulse code modulation (DPCM) block 100 which has a compressor 10, a decompressor 20 and a motion compensation block 40. The compressor 10, as is well known in the art, employs a Discrete Cosine Transform ("DCT") circuit 11 and a quantization circuit 12, which are described in, e.g., U.S. Pat. No. 5,134,477 issued on Jul. 28, 1992, while the decompressor 20 employs an inverse quantization circuit and an inverse DCT circuit (not shown). The motion compensation block 40 is a conventional component used to predict a current video frame signal from a previous video frame signal.

The video frame signal is generated from a video signal source, e.g., video camera(not shown), and applied to a subtraction circuit 50 in successive blocks for the processing thereof on a block-by-block basis. Each block has a plurality of data elements, e.g., 8×8 pixels. The predicted video frame signal is extracted at the motion compensation block 40 and then coupled to the subtraction circuit 50, which generates a differential signal between the current video frame signal and the predicted video frame signal. The differential signal is transform coded and quantized at the compressor 10 to generate coded data. The coded data is then transmitted to a receiver (not shown), and also coupled to the decompressor 20 wherein the digital data is converted back to the differential signal. The differential signal is then coupled to an adder circuit 60 wherein it is combined with the predicted video signal and reconstructed to a video frame signal identical to the video frame signal prior to its compression. The reconstructed video frame signal as the previous video frame signal is coupled through a frame store block 30 to the motion compensation block 40 for extracting the predicted video frame signal for a subsequent video frame signal. Therefore, the bit rate reduction is achieved by taking advantage of the fact that the differential signals are generally distributed over a small dynamic range and consequently can be represented by a smaller number of bits.

As is described the above, the compressor 10 includes the DCT circuit 11 and the quantization circuit 12. The quantization circuit 12 has a delay 12a, a quantization pattern codebook 12b, a quantization pattern selector 12c, and a quantization block 12d. The quantization pattern codebook 12b may be constructed by a Read Only Memory (ROM) which has a plurality of memory locations for storing a preselected number of quantization patterns. Each quantization pattern includes a set of 8×8 1-dimensional quantizers.

The differential signal generated from the subtraction circuit 50 is coupled in successive blocks to the DCT circuit 11 which develops a plurality of sets of 8×8 frequency domain coefficients, each set corresponding to the block of the differential signal. In order to simplify coding process at the quantization block 12d, said sets of 8×8 frequency domain transform coefficients are grouped into 2×2 arrays at the DCT circuit 11.

Figure 2:
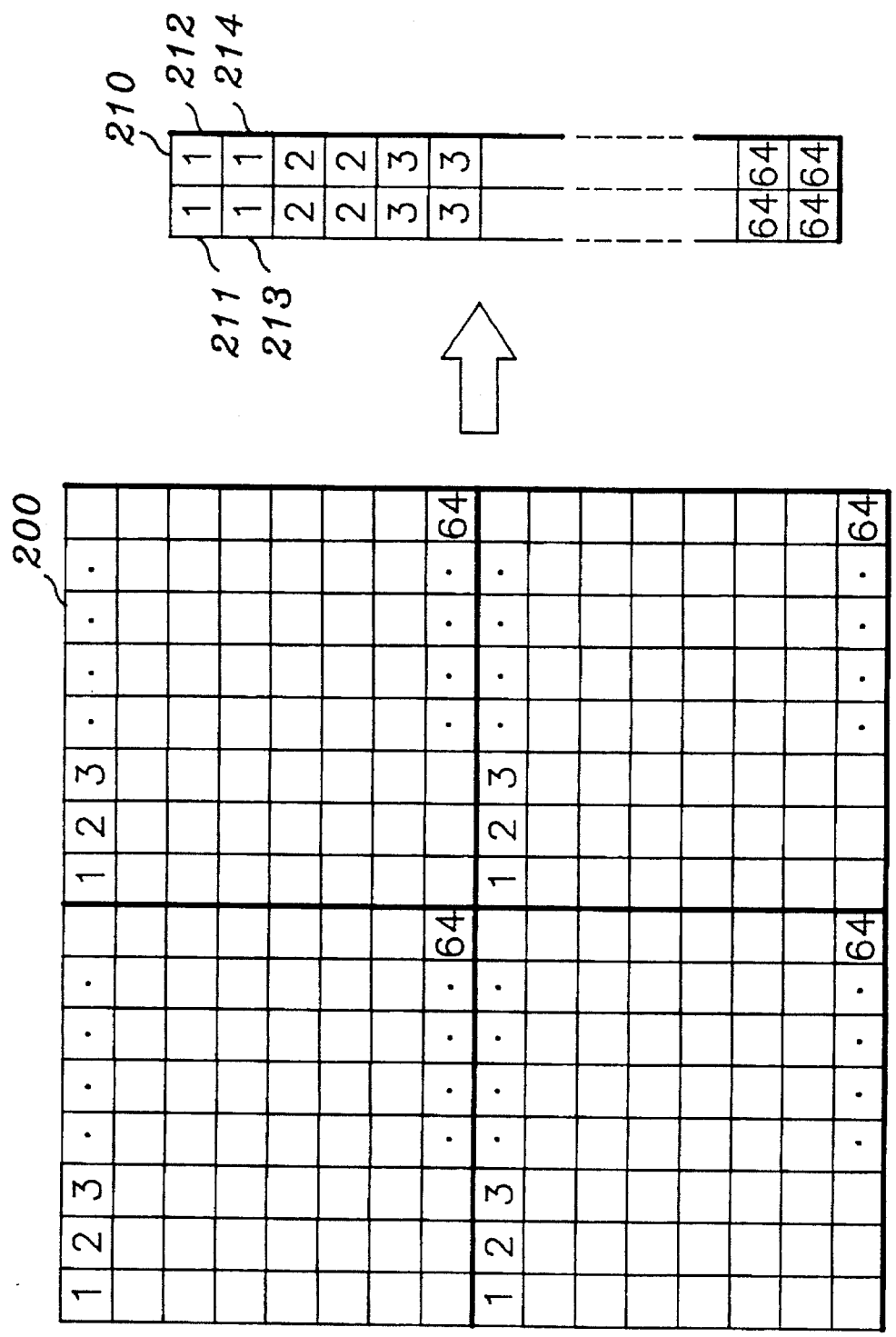
FIG. 2 is a schematic diagram illustrating an arrangement of a superblock that is quantized at the quantization block shown in FIG. 1.

Referring to FIG. 2, a 2×2 array of 8×8 transform coefficients 200 for the quantization process is illustrated and combined to form a 64 cell superblock vector 210, wherein each cell contains 4 transform coefficients 211, 212, 213, and 214. As shown in FIG. 1, the 64 cell superblock vector 210 is then coupled to the quantization pattern selector 12c and also coupled via a delay line 12a to the quantization block 12d. The quantization pattern selector 12c and the quantization block 12d serve to select an appropriate quantization pattern corresponding to the 64 cell superblock vector 210. The selection of the appropriate quantization pattern is achieved by: estimating the overall selection error, i.e., a total quantization noise, for the superblock vector 210 which is the sum of the selection errors, i.e., quantization noises, of the 64 individual cells for each of the quantization patterns in the codebook 12b; and selecting the quantization pattern that offers the lowest overall selection error. In cases where two different quantization patterns offer a same or almost the same overall selection error, the quantization pattern that generates fewer quantization bits when the superblock is selected (see U.S. Pat. No. 5,134,477).

When an appropriate quantization pattern corresponding to the 64 cells on a superblock vector is selected, the quantization pattern selector 12c develops index information, IDX, representative of the selected quantization pattern which is applied to the decompressor 20 and a conventional variable length coder (not shown) for transmission thereof, while the quantization block 12d develops the quantized values of the superblock vector cells which are also applied to the conventional variable length coder and to the decompressor 20. At the decompressor 20, an inverse quantizer pattern corresponding to the selected quantizer pattern is chosen in accordance with the index information IDX.

As may be seen from the above, each quantizer contained in a selected quantization pattern serves to quantize the coefficients in each corresponding cell. That is, a different quantizer is used for quantizing a different cell. As is known in the art, the number of different quantizers is limited to a preselected number, e.g., 4, to reduce the hardware requirement and to simplify the encoding operation. Then, the total number of possible quantization patterns becomes $4^{64}$, ($3.4 \times 10^{38}$). For further simplification, a conventional codebook employs a limited number of quantization patterns which are elected from the possible quantization patterns. The number may be, for instance 2048, which requires 11 bits of index information IDX. Therefore, it is important to note that the task of choosing 4 different quantizers and the limited number of patterns plays a key role in dictating the performance of the quantization circuit 12 shown in FIG. 1.

Figure 3:
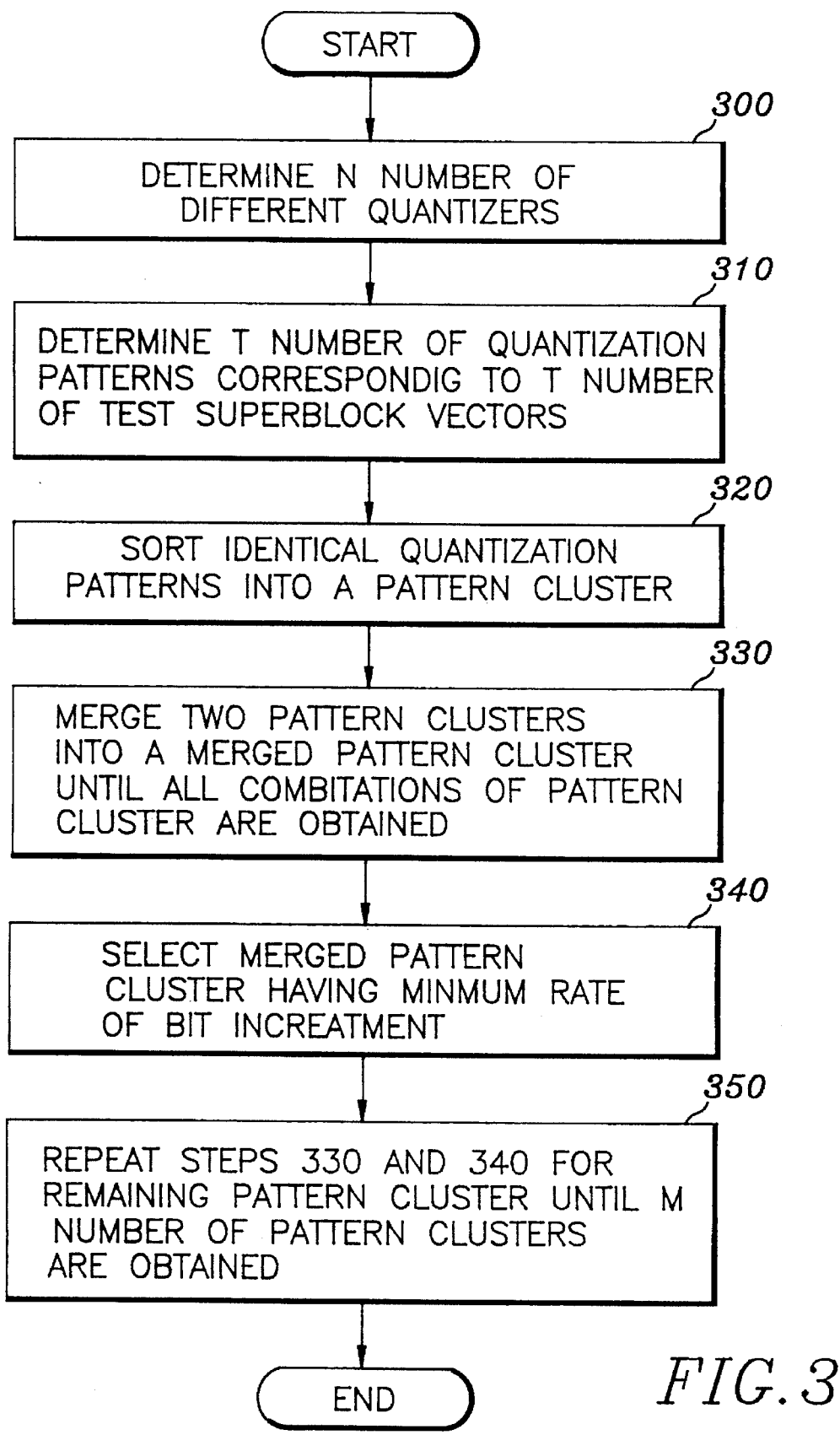
FIG. 3 is a flow chart describing the quantization pattern codebook construction method in accordance with the present invention.

Referring to FIG. 3, there is shown a flow chart illustrating the inventive method for constructing a quantization pattern codebook, which is implemented through the use of a software contained in a conventional microprocessor (not shown).

In the step 300, the process determines 4 different quantizers. The 1-dimensional quantizer $Q^k$ may be represented as follows:

$$\{Q^k\}=\{y_j^k|j=0,1,\ldots,L_k\}$$

where k is the index of for quantizer and ranges from 0, 1, ... to N−1; N and $L_k$ are positive integers, respectively; and j is the quantization level.

The different quantizers $Q^k$, e.g., 4 different quantizers $Q^0$, $Q^1$, $Q^2$, $Q^3$, are elected from the group of quantizers defined by:

$$\{Q^0\}\subset\{Q^1\}\subset\{Q^2\}\subset\ldots\subset\{Q^{N-1}\}$$

where N is the same as previously defined.

Figure 4A:
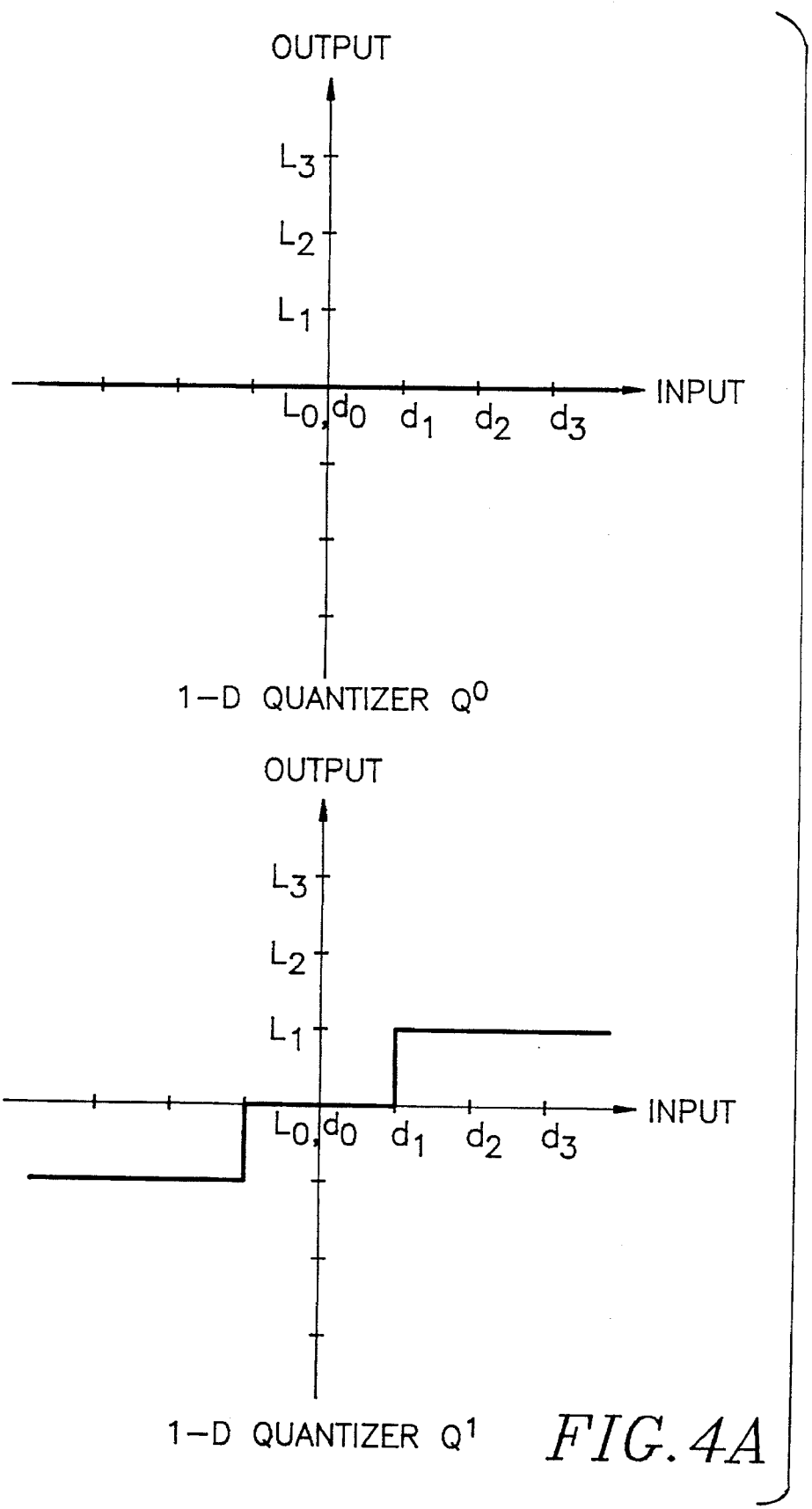
FIGS. 4A and 4B are exemplary diagrams depicting the relationship between the input and the output for each of the 4 quantizers selected at step 300 shown in FIG. 3.
Figure 4B:
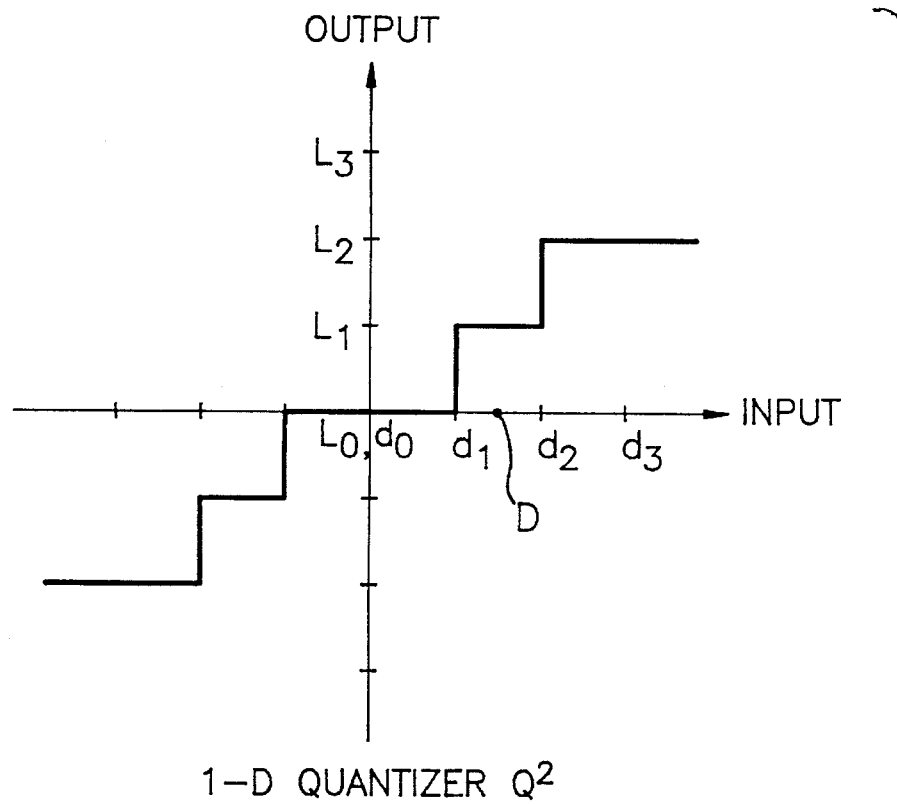
Figure 4B:
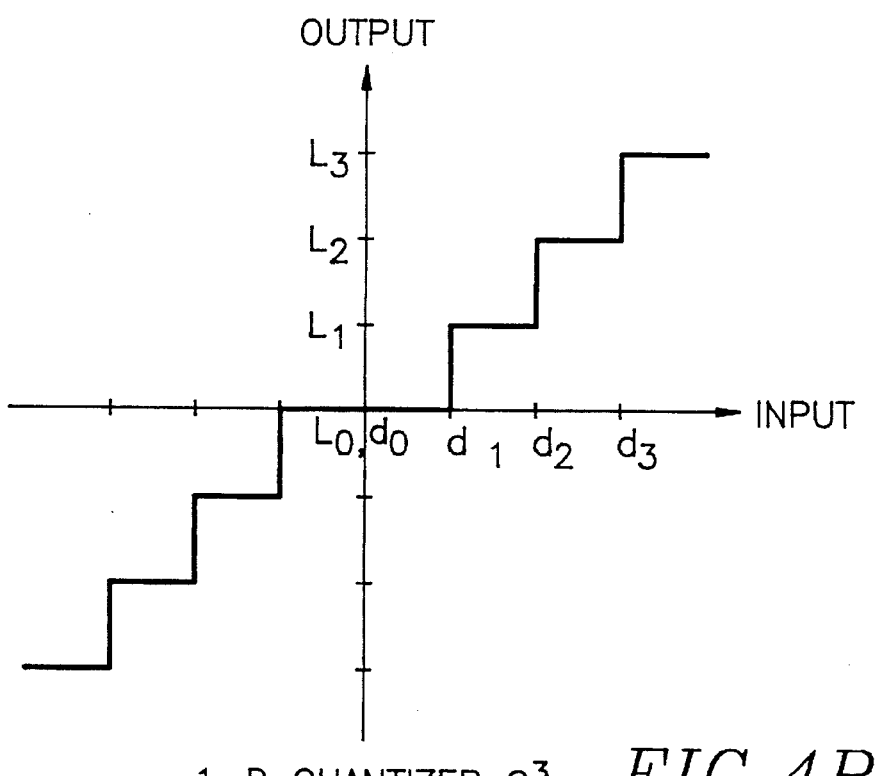

FIGS. 4A and 4B show 4 exemplary quantizers elected at the step 300 shown in FIG. 3, wherein the horizontal axis represents the decision boundaries, i.e., input of a quantizer and the vertical axis represents the quantization levels, i.e., outputs of a quantizer. As shown, quantizer $Q^0$ includes a decision boundary $d_0$ and has a quantization level $L_0$;

quantizer $Q^1$ has two decision boundaries $d_0$, $d_1$ and two quantization levels $L_0$ and $L_1$; quantizer $Q^2$ includes three decision boundaries $d_0$, $d_1$, and $d_2$ and three quantization levels $L_0$, $L_1$, and $L_2$; and quantizer $Q^3$ has four decision boundaries $d_0$, $d_1$, $d_2$, and $d_3$ and four quantization levels $L_0$, $L_1$, $L_2$, and $L_3$. Therefore, in the quantizer $Q^3$, a transform coefficient located between the decision boundaries $d_0$ and $d_1$ is mapped to the quantization level $L_0$; a transform coefficient located between the decision levels $d_1$ and $d_2$ is quantized to the quantization level $L_1$; a transform coefficient located between the decision boundaries $d_2$ and $d_3$ is mapped to the quantization level $L_2$; a transform coefficient located beyond the decision boundaries $d_3$ is represented by the quantization level $L_3$.

As is described above, a higher quantizer, e.g., $Q^3$ includes all of the quantization levels in a lower quantization $Q^2$, i.e., $L_0$, $L_1$, and $L_2$. If the transform coefficient D is located between decision boundaries $d_1$ and $d_2$, the transform coefficient D is quantized by the quantizer $Q^1$ and represented by the quantization level $L_1$. Therefore, the higher quantizers $Q^2$ and $Q^3$ can also be used for quantizing the transform coefficient D. On the other hand, the output from the lower quantizer $Q^1$ having 2 quantization levels is represented by 1 bit, while the outputs from the higher quantizers $Q^2$ and $Q^3$ having 3 and 4 quantization levels are respectively represented by 2 bit.

As may be seen from the above, it should be appreciated that, although the output from the higher quantizer $Q^2$ has more bits than that of the lower quantizer $Q^1$, the quantization carried out by using the high level quantizer $Q^2$ yields a quantization noise identical to that from the lower quantizer $Q^1$ since the higher level quantizer $Q^2$ includes all of the quantization levels contained in the lower quantizer $Q^1$.

Referring back to FIG. 3, in step 310, the process develops a plurality of quantization patterns corresponding to a predetermined number of conventional test image blocks for use in simulating the video signal. As shown in FIG. 2, each test image block has a 2×2 array of 8×8 frequency domain coefficients and forms a 64 cell test superblock vector wherein each cell contains 4 frequency domain transform coefficients. Each quantization pattern is constructed using the 4 quantizers selected at the step 300 to yield a minimum quantization noise when the corresponding test superblock vector is quantized thereby. When all of the quantization patterns corresponding to the predetermined number of test superblock vectors are constructed, the process proceeds to step 320.

In step 320, identical patterns in the constructed quantization patterns are grouped or sorted into a pattern cluster.

In step 330, each pair of the pattern clusters are merged into a merged pattern cluster until all of combinable pairs of the quantization patterns are merged.

In step 340, the merged pattern cluster having a minimum rate of bit increment is selected. The selection is achieved as follows: calculating a rate of bit increment by subtracting the total number of quantization bits in the each pair of quantization patterns used in the step 330 from the total number of quantization bits in the merged pattern cluster derived from the pair of pattern clusters until all of the rates of bit increment for all of the merged pattern clusters are obtained; determining a merged pattern cluster having a minimum rate of bit increment. The quantization pattern used in forming the selected merged pattern cluster and the merged pattern clusters which are not selected are discarded. Therefore, remaining pattern clusters includes the selected merged pattern cluster and the pattern clusters which are not used for generating the selected merged pattern cluster.

In step 350, for the remaining pattern clusters, the steps 330 and 340 are repeated, until a predetermined number of the pattern clusters are obtained. the respective quantization pattern representative of the predetermined number of the pattern clusters are stored in the quantization pattern codebook shown in FIG. 1. As is described above, preferably, the number of the pattern clusters may be 2048.

Figure 5:
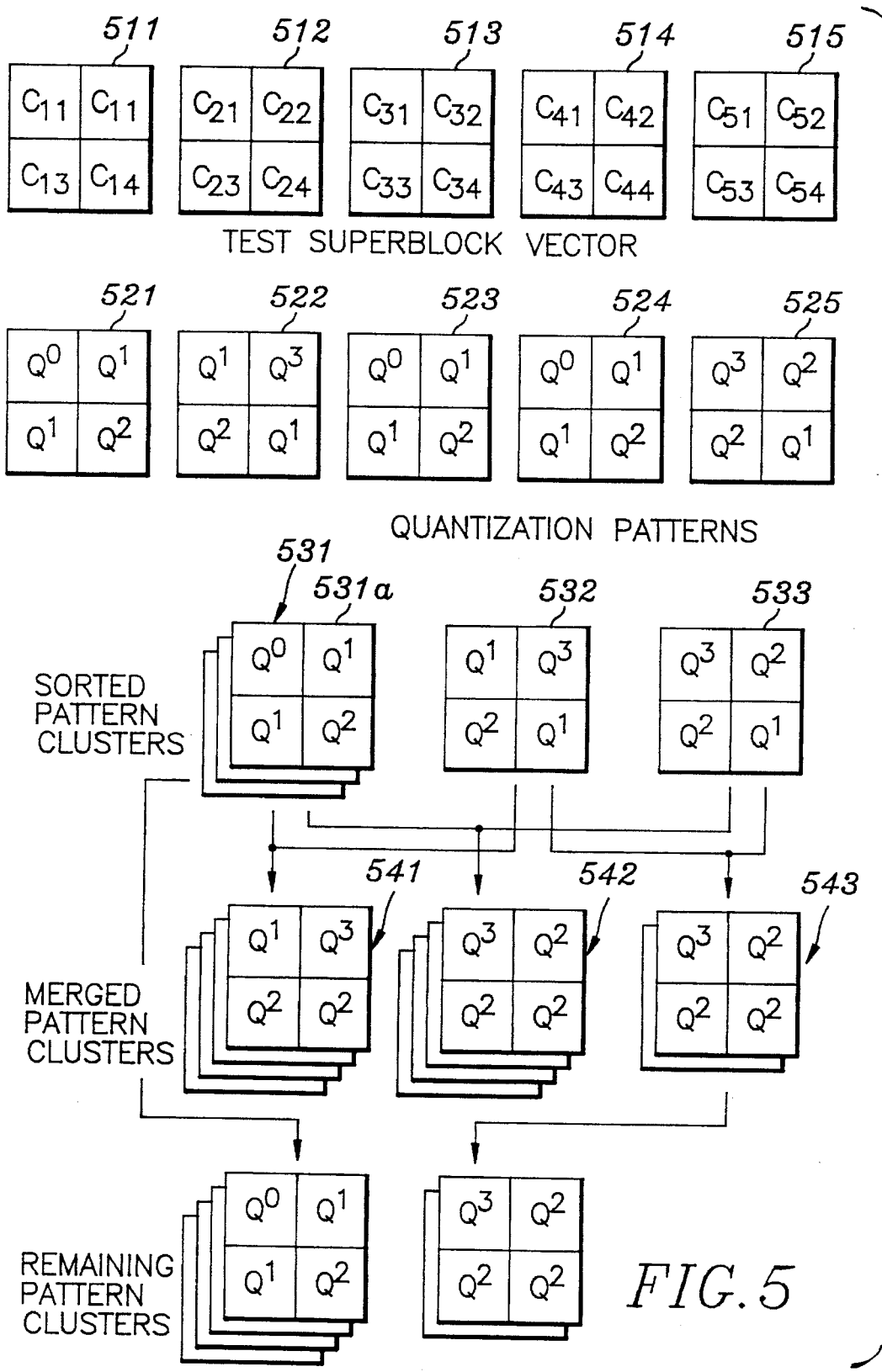
FIG. 5 is a diagram explaining the process of constructing the quantization pattern codebook in accordance with the present invention.

Referring to FIG. 5, there is shown an explanatory diagram depicting the construction of the quantization pattern codebook on accordance with the present invention. For the sake of convenience, it is assumed that the number of test superblock vectors 511, 512, 513, 514, 515 is 5, each test superblock vector, e.g., 511 having 4 cells, e.g., C11, C12, C13, and C14. As described in the step 310 shown in FIG. 3, the process determine 5 quantization patterns 521, 522, 523, 524, 525, corresponding to the test quantization patterns 511, 512, 513, 514, 515. Thereafter, the identical quantization patterns 521 523, 524 are sorted a pattern cluster 531 which has 3 quantization pattern (step 320 shown in FIG. 3). The quantization patterns 522 and 525 are sorted to the pattern cluster 532 and 533, respectively.

As described in step 330 (FIG. 3), the pattern clusters 531, 532, and 533 are merged, two by two, into merged pattern clusters 541, 542, and 543. The merged pattern cluster 541 has a representative quantization pattern 541a and 4 pattern clusters wherein the lower quantizer $Q^0$ and $Q^1$ contained in the pattern cluster 531 is substituted with the quantizer $Q^2$ and $Q^3$. The merged pattern cluster 543 having a minimum rate of bit increment is selected, and the merged pattern cluster 541 and the sorted pattern cluster 531 are maintained for next process as is described in the steps 340 and 350.

Figure 6A:
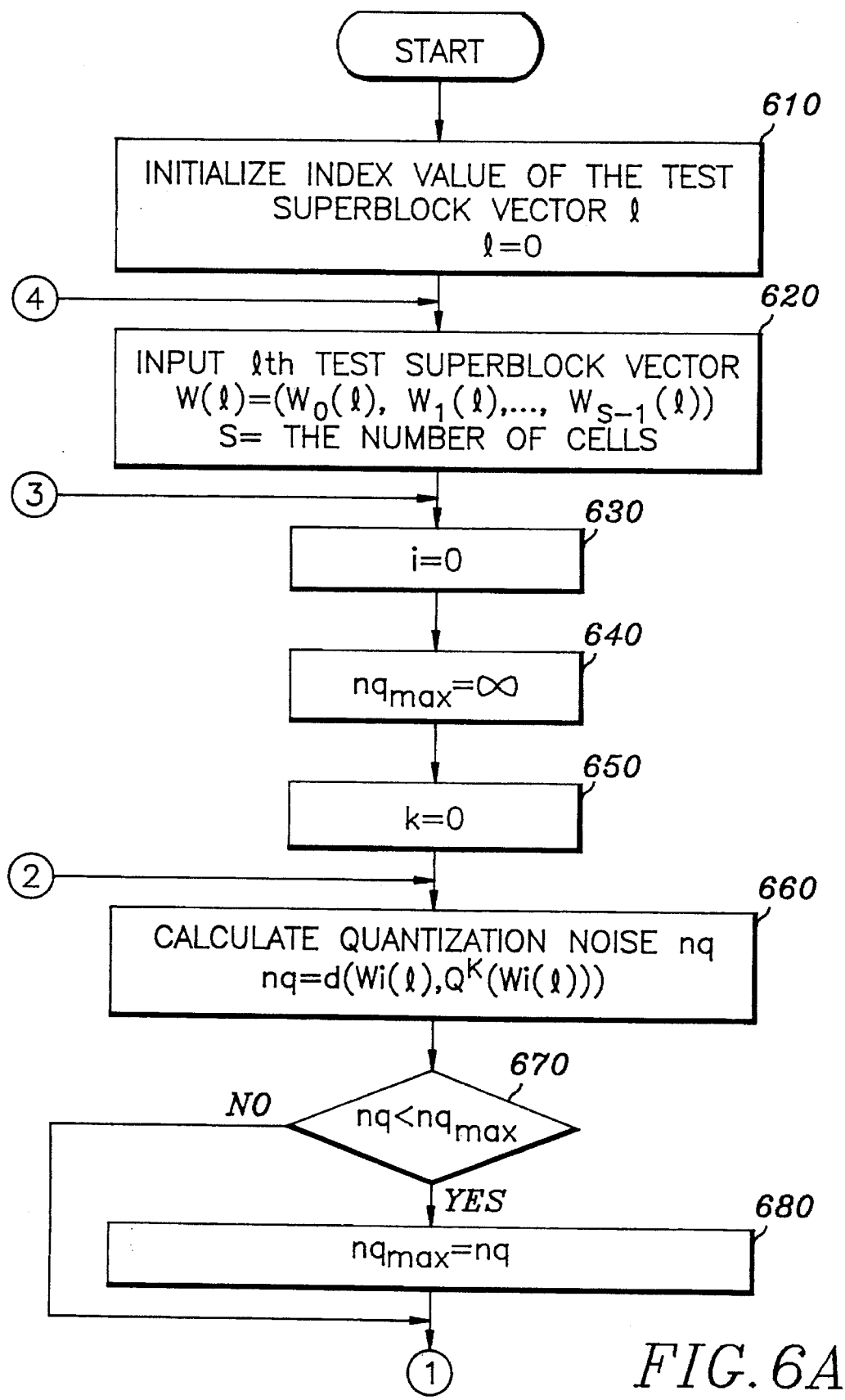
FIGS. 6A and 6B are flow charts showing step 310 in FIG. 3, in detail.
Figure 6B:
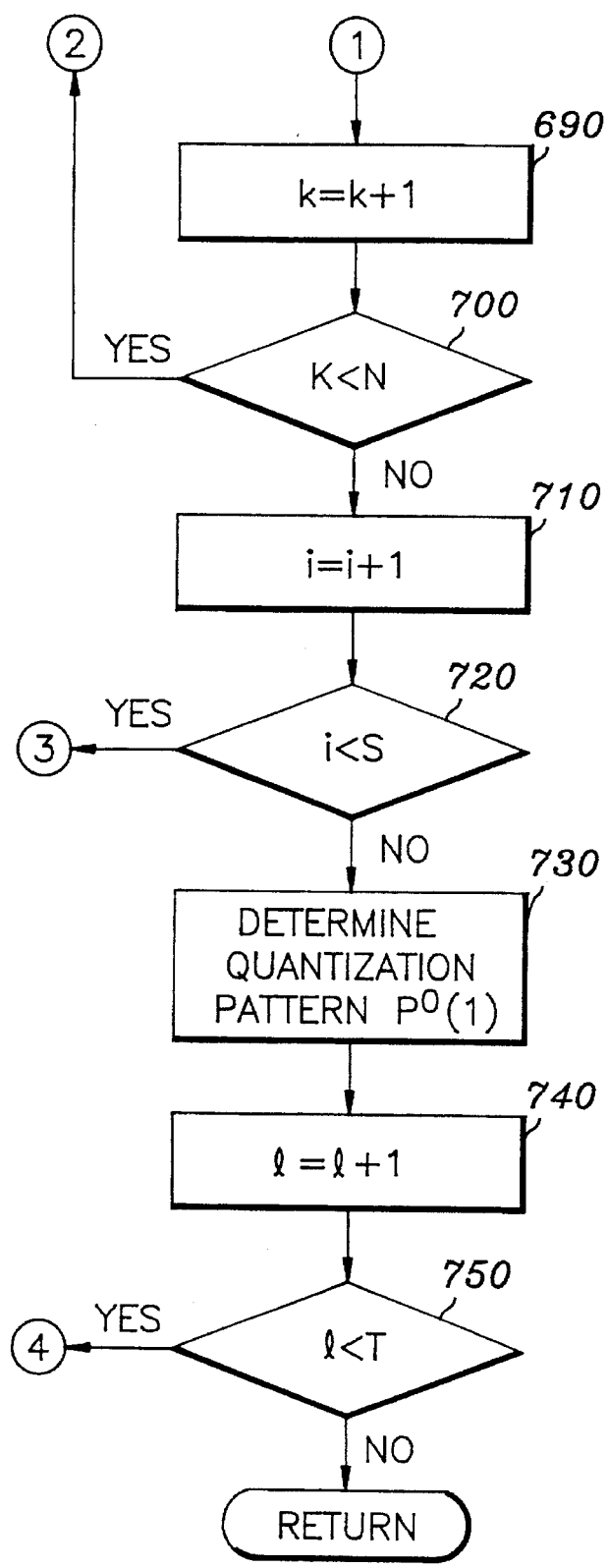

Referring to FIG. 6, there is shown a flow chart illustrating the step 310 shown in FIG. 3. In step 610, a index of the test superblock vector l is initialized into and, in step 620, lth test superblock vector W(l) is inputted. The test superblock vector W(l) is defined as follows:

$$W(l)=(W_0(l), \ldots, W_{S-1}(l)),$$

where Wi(l) is a cell; S is the number of the cell; l=0,1, . . . , T; and T is the number of the superblock vector.

In step 630, an index of the test vector i is initialized to "0".

In steps 640 and 650, a reference quantization noise value $nq_{max}$ is set to "∞", and a index of the quantizer k is initialized into "0".

In step 660, the process calculates a quantization noise value nq through the use of the conventional quantization noise estimation method. That is, when the cell Wi(l) contained in the superblock vector W(l) is quantized by the quantizer $Q^k$, the quantization noise is represented as follows:

$$nq=d((Wi(l)), Q^k(Wi(l)))$$

where d is a value of the quantization noise and $Q^k(l)$ is an output of the quantizer $Q^k$.

Then, in step 670, the calculated quantization noise value nq is compared with the reference quantization noise value $nq_{max}$. If the calculated quantization noise value nq is smaller than the reference quantization noise value $nq_{max}$, in step 680, the reference quantization noise value $nq_{max}$ is updated by the calculated quantization noise value nq and the step 680 is proceed to the step 690. If not, the step 670 is proceed to step 690 where a index of the quantizer k is increased by one.

In step 700, an increased index k is compared with a predetermined number of the quantizer N. If the increased index is greater than the predetermined number of the quantizer, the process proceeds to step 710. If not, the process is returned to the step 660. Therefore, for the cell Wi(l), the quantizer $Q^k$ having a minimum quantization noise can be obtained.

In step 710, the index of the cell i is increased by one and, in step 720, the incremented index of the cell i is compared to the a predetermined number of the cell S. If the incremented index of the element i is greater than the predetermined number of the cell S, in step 730, the process determined a quantization pattern $p^0(l)$ through the use of the quantizers determined in the steps 660 through 720. If not, the process is returned to step 630. The quantization pattern $p^0(l)$ is represented as follows:

$$P^0(l) = (P_0^0(l), P_1^0(l), \ldots, P_{S-1}^0(l))$$

where l and s are previously described. The index of the test superblock vector l is increased by one at step 740 and, in step 750, the increased index of the test superblock vector l is compared to the predetermined number of the test vector T. If the increased index of the test superblock vector l is greater than the predetermined number of the test superblock vector T, the process is terminated. If not, the process is returned to the step 620. Therefore, all quantization pattern corresponding to the test superblock vectors are obtained.

Figure 7:
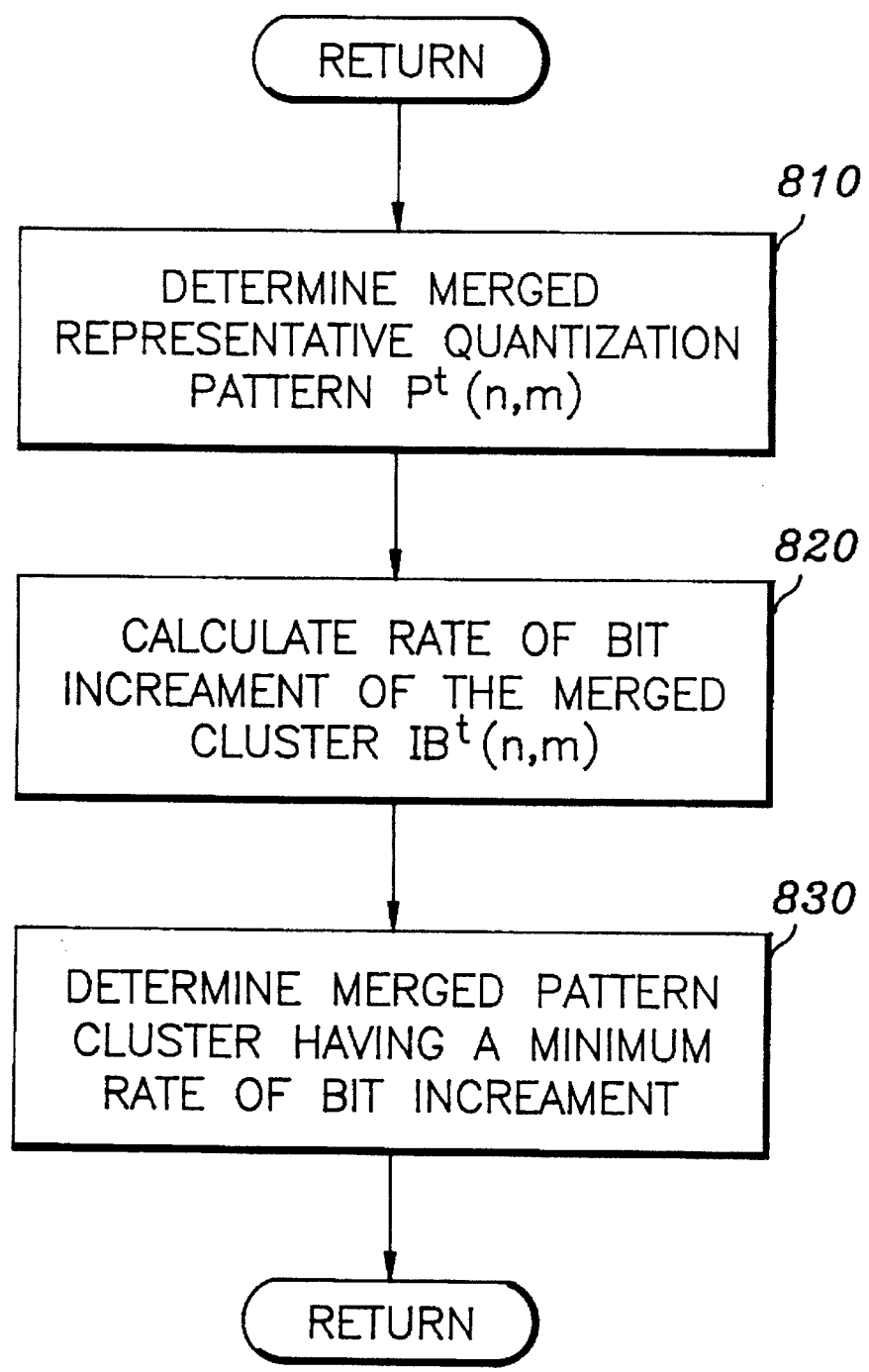
FIG. 7 is a flow chart setting forth step 330 shown in FIG. 3, in detail.

Referring to FIG. 7, there is a flow chart describing the steps 330 and 340 shown in FIG. 3. In step 810, the representative quantization patterns $P^t(n)$ and $P^t(m)$ of the pattern clusters $C^t(n)$ and $C^t(m)$ are merged into a merged representative quantization pattern $P^t(n,m)$ of the merged pattern cluster $C^t(n,m)$.

In step 820, a rate of bit increment of the merged cluster $IB^t(n,m)$ is calculated as follows:

$$IB^t(n,m) = BC^t(n,m) - (BC^t(n) + BC^t(m))$$

where $BC^t(n,m)$ is the total number of quantization bits of the merged pattern cluster $C^t(n,m)$, and $BC^t(n)$ and $BC^t(m)$ are the total number of quantization bits of the pattern cluster $C^t(n)$ and $C^t(m)$, respectively.

As may be seen from the illustration given in FIG. 5, a rate of bit increment of the merged pattern cluster 541, as may be represented by $IBC^0(1,2)$, is obtained as follows:

$$\begin{aligned} IBC^0(1,2) &= BC^0(1,2) - \{BC^0(1) + BC^0(2)\} \\ &= (1+2+2+2) \times 4 - \{(1+1+1+2) \times 3 + (1+2+2+1) \times 1\} \\ &= 7. \end{aligned}$$

This process is continued until all of the rates of bit increment in all of the merged clusters are obtained. When all of the rates of bit increment in the all of the merged cluster are obtained, the process proceeds to step 840.

In step 830, the merged patten cluster $C^t(n,m)$ having a minimum rate of bit increment is selected and the process is terminated.

As may be seen from the above, it should be readily appreciated that the quantization pattern codebook constructed in accordance with inventive method may be advantageously employed in a video encoding apparatus, so as to provide minimum and regularized quantization errors and a minimum amount of quantized data.

While, the present invention has been described with respect to the particular embodiments, it will be apparent to those skilled in the art that various changes and modifications may be made without departing from the spirit and scope of the invention as defined in the following claim.

What is claimed is:

1. A method for constructing a quantization pattern codebook for use in an image coding apparatus, wherein the quantization codebook has M number of quantization patterns, each of the M quantization patterns having N number of different quantizers, each of the N quantizers including one or more quantization levels, with M and N being positive integers, which comprises the steps of:

(a) selecting the N number of different quantizers wherein a higher quantizer includes all of the quantization levels in a lower quantizer;

(b) forming T number of quantization patterns corresponding to T number of test superblock vectors using the selected N number of different quantizers, each of the quantization patterns having a minimum quantization error for each of the test superblock vectors, wherein T is a positive integer and greater than M;

(c) sorting the T number of quantization patterns into a plurality of pattern clusters, wherein identical quantization patterns are grouped into a pattern cluster;

(d) merging each pair of the pattern clusters into a merged pattern cluster;

(e) repeating said step (d) until all of the combinable pairs of the pattern clusters are merged into their respective merged pattern clusters;

(f) calculating a rate of bit increment by subtracting the total number of quantization bits in said each pair of pattern clusters used in said step (d) from the total number of quantization bits in the merged pattern cluster derived from said each pair of pattern clusters;

(g) repeating said step (f) until all of the rates of bit increment for all of the merged pattern clusters are obtained;

(h) determining a merged pattern cluster having a minimum rate of bit increment;

(i) setting the determined merged pattern cluster as pattern cluster;

(j) repeating said steps (d) to (j) by using all of pattern clusters excepting the pair of pattern clusters used in forming the merged pattern cluster determined in said step (h) until M number of pattern clusters are obtained as said M number of quantization patterns to be used in the quantization pattern codebook.

\* \* \* \* \*